(12) United States Patent
Huang et al.

(10) Patent No.: US 11,762,439 B2
(45) Date of Patent: Sep. 19, 2023

(54) METHOD AND APPARATUS OF DYNAMIC THERMAL MANAGEMENT BASED ON SURFACE TEMPERATURES OF PORTABLE DEVICE

(71) Applicant: MEDIATEK INC., Hsin-Chu (TW)

(72) Inventors: Pei-Yu Huang, Hsinchu (TW); Chih-Yuan Hsiao, Hsinchu (TW); Chiao-Pin Fan, Hsinchu (TW); Chi-Wen Pan, Hsinchu (TW); Tai-Yu Chen, Hsinchu (TW); Chien-Tse Fang, Hsinchu (TW); Jih-Ming Hsu, Hsinchu (TW); Yun-Ching Li, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 934 days.

(21) Appl. No.: 16/718,099

(22) Filed: Dec. 17, 2019

(65) Prior Publication Data

US 2021/0181821 A1    Jun. 17, 2021

(51) Int. Cl.
*G05D 23/00* (2006.01)
*G06F 1/20* (2006.01)
*G06F 1/3206* (2019.01)

(52) U.S. Cl.
CPC .............. *G06F 1/206* (2013.01); *G06F 1/203* (2013.01); *G06F 1/3206* (2013.01)

(58) Field of Classification Search
CPC ........ G06F 1/206; G06F 1/203; G06F 1/3206; G06F 1/3234; G01R 31/281; G01R 21/02; G01R 31/2817
See application file for complete search history.

(56) References Cited

U.S. PATENT DOCUMENTS

| | | | |
|---|---|---|---|
| 8,260,473 B1* | 9/2012 | O'Brien | H01L 23/34 713/323 |
| 2005/0071705 A1* | 3/2005 | Bruno | G06F 1/206 713/500 |
| 2008/0001634 A1* | 1/2008 | Arabi | G06F 9/3885 326/99 |
| 2014/0006818 A1* | 1/2014 | Doshi | G06F 1/206 713/320 |
| 2015/0006937 A1* | 1/2015 | Rotem | G06F 1/3215 713/324 |
| 2015/0350407 A1* | 12/2015 | Hsu | G06F 1/206 455/418 |
| 2016/0291665 A1* | 10/2016 | Wang | G05D 23/1917 |
| 2017/0111988 A1* | 4/2017 | Wang | G06F 1/206 |
| 2017/0290194 A1* | 10/2017 | Mittal | H05K 7/20472 |
| 2017/0351279 A1* | 12/2017 | Ishii | G06F 3/0679 |
| 2018/0245986 A1* | 8/2018 | Pan | G06F 1/206 |

(Continued)

FOREIGN PATENT DOCUMENTS

| | | |
|---|---|---|
| CN | 108027633 A | 5/2018 |
| CN | 109642829 A | 4/2019 |

(Continued)

*Primary Examiner* — Zhipeng Wang
(74) *Attorney, Agent, or Firm* — Winston Hsu

(57) ABSTRACT

The present invention provides a method of dynamic thermal management applied to a portable device, wherein the method includes the steps of: obtaining a surface temperature of the portable device; obtaining a junction temperature of a chip of the portable device; and calculating an upper limit of the junction temperature according to the junction temperature and the surface temperature.

16 Claims, 5 Drawing Sheets

(56) References Cited

U.S. PATENT DOCUMENTS

2019/0313552 A1    10/2019  Curtis
2019/0339750 A1    11/2019  Siddiqui

FOREIGN PATENT DOCUMENTS

| CN | 109710048 A | 5/2019 |
| JP | 2015-95629 A | 5/2015 |
| TW | 201800894 A | 1/2018 |
| TW | 201812507 A | 4/2018 |
| TW | 201832044 A | 9/2018 |

* cited by examiner

METHOD AND APPARATUS OF DYNAMIC THERMAL MANAGEMENT BASED ON SURFACE TEMPERATURES OF PORTABLE DEVICE

BACKGROUND

In order to give a user a comfortable and acceptable touch temperature when using a handheld device, thermal throttling (dynamic thermal management) is inevitable to meet limited surface temperature for heavily loading scenarios. In the conventional art, a temperature information obtained by using a thermal sensor on the printed circuit board (PCB) is applied as a key performance indicator for the dynamic thermal management. However, because of the distance between the PCB and the case of the handheld device, the PCB temperature cannot truly reflect the surface temperature of the handheld device, and the thermal throttling may occur before the surface temperature actually reaches an upper limit of the surface temperature, and the processor starts to dump performance until the temperature drops to a safe operating range even if the actual surface temperature is not high enough, therefore affecting the performance of the handheld device.

SUMMARY

It is therefore an objective of the present invention to provide a method of the dynamic thermal management based on surface temperatures of portable device, to solve the above-mentioned problems.

According to one embodiment of the present invention, a method of dynamic thermal management applied to a portable device is disclosed, wherein the method comprises the steps of: obtaining a surface temperature of the portable device; obtaining a junction temperature of a chip of the portable device; and calculating an upper limit of the junction temperature according to the junction temperature and the surface temperature.

According to one embodiment of the present invention, a portable comprising a junction temperature limit calculator is disclosed. The junction temperature limit calculator comprises a buffer and a calculating circuit, wherein the buffer is arranged to store a surface temperature of the portable device and a junction temperature of a chip of the portable device, and the calculating circuit is configured to calculate an upper limit of the junction temperature according to the junction temperature and the surface temperature.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
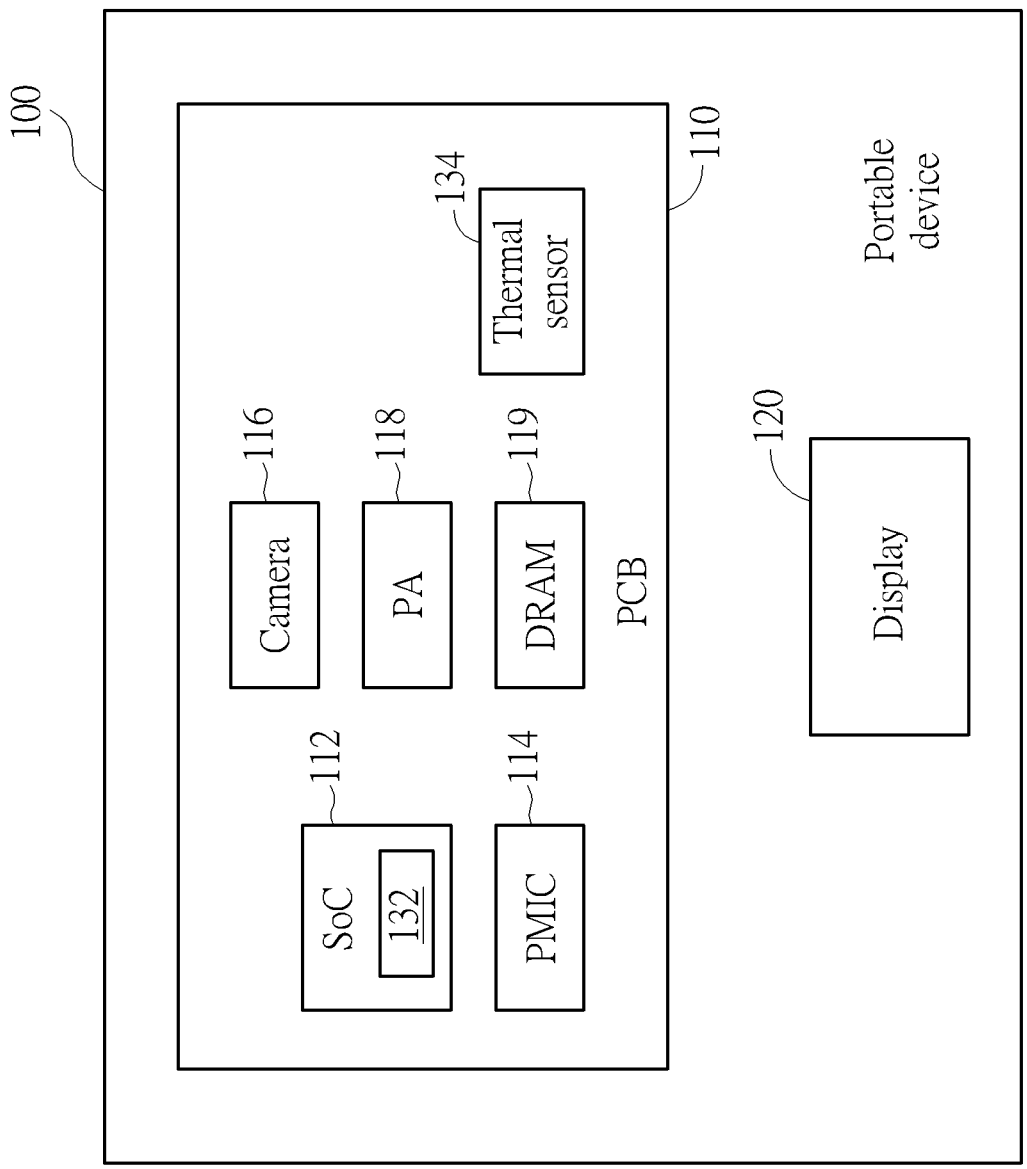
FIG. 1 is a diagram illustrating a portable device according to one embodiment of the present invention.

FIG. 1 is a diagram illustrating a portable device 100 according to one embodiment of the present invention. As shown in FIG. 1, the portable device 100 comprises a PCB 110 and a display 120, where the PCB 110 has at least a system on chip (SoC) 112, a power management integrated circuit (PMIC) 114, a camera 116, a power amplifier 118 and a dynamic random access memory (DRAM) 119 mounted thereon. In this embodiment, the SoC 112 comprises a thermal sensor 132 for providing a junction temperature (i.e., internal temperature of the SoC 112), the PCB 110 has a thermal sensor 134 for providing a PCB temperature, and the SoC 112 comprises an application processor for controlling the operations of the portable device and performing dynamic thermal management to determine the power budget of the elements and circuit module's operating points (e.g. supply voltage or clock frequency).

Figure 2:
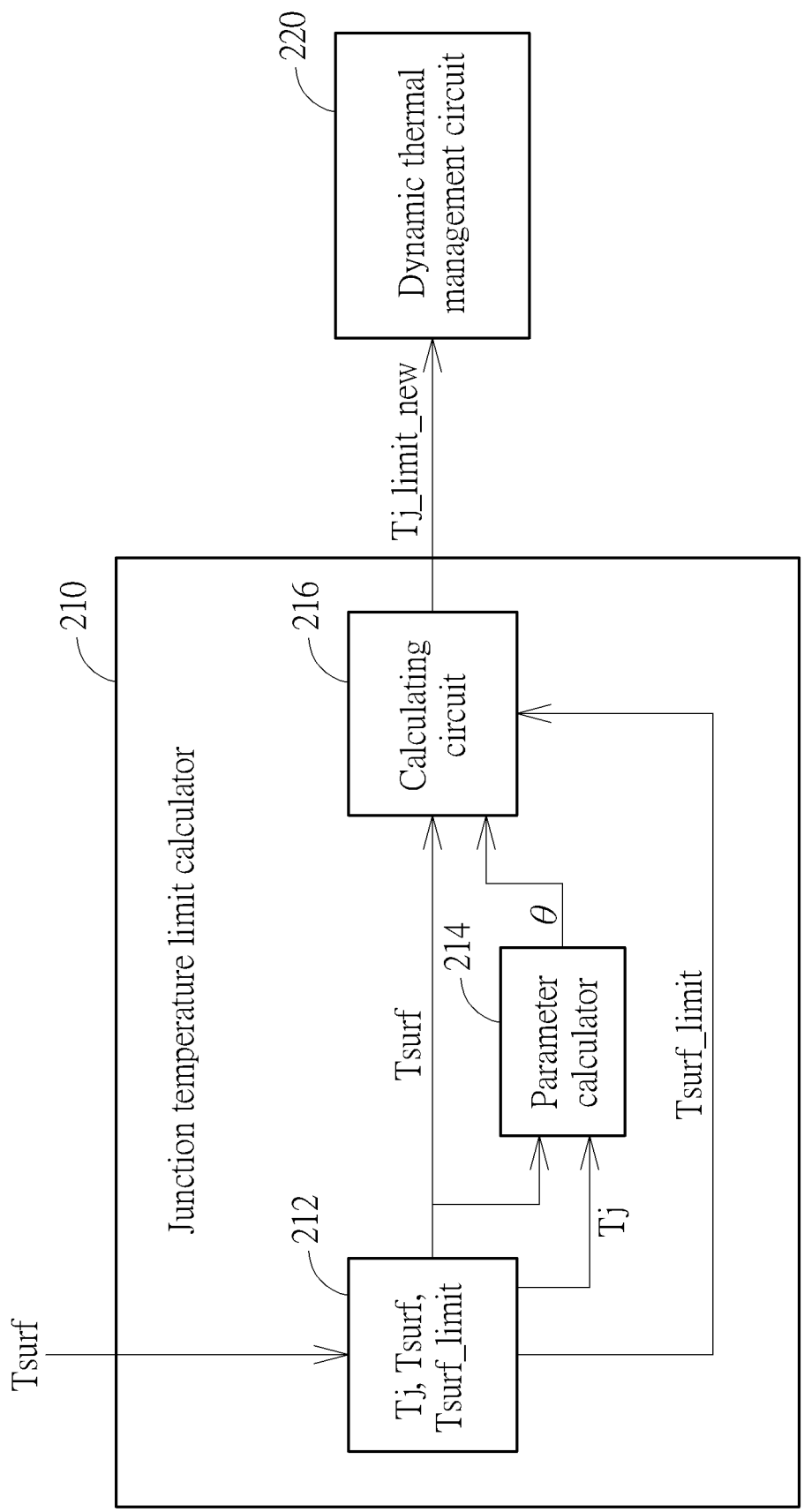
FIG. 2 is a diagram illustrating a junction temperature limit calculator and a dynamic thermal management circuit according to one embodiment of the present invention

FIG. 2 is a diagram illustrating a junction temperature limit calculator 210 and a dynamic thermal management circuit 220 according to one embodiment of the present invention, wherein the junction temperature limit calculator 210 and the dynamic thermal management circuit 220 can be built in the SoC 112. As shown in FIG. 2, the junction temperature limit calculator 210 comprises a buffer 212, a parameter calculator 214 and a calculating circuit 216. In the operations of the junction temperature limit calculator 210, the buffer 212 is used for storing a junction temperature Tj measured by the thermal sensor 132 in a real-time manner, a surface temperature Tsurf and an upper limit of the surface temperature Tsurf_limit, wherein the surface temperature Tsurf can be estimated by using the PCB temperature measured by the thermal sensor 134 (e.g. using the method described in US publication no. 2018/0245986) in a real-time manner or periodically, and the upper limit of the surface temperature Tsurf_limit is pre-determined. The parameter calculator 214 is used to calculate a parameter θ based on the current junction temperature Tj and the current surface temperature Tsurf. The calculating circuit 216 is configured to generate a new upper limit of the junction temperature Tj_limit_new to update the previous upper limit of the junction temperature.

Figure 3:
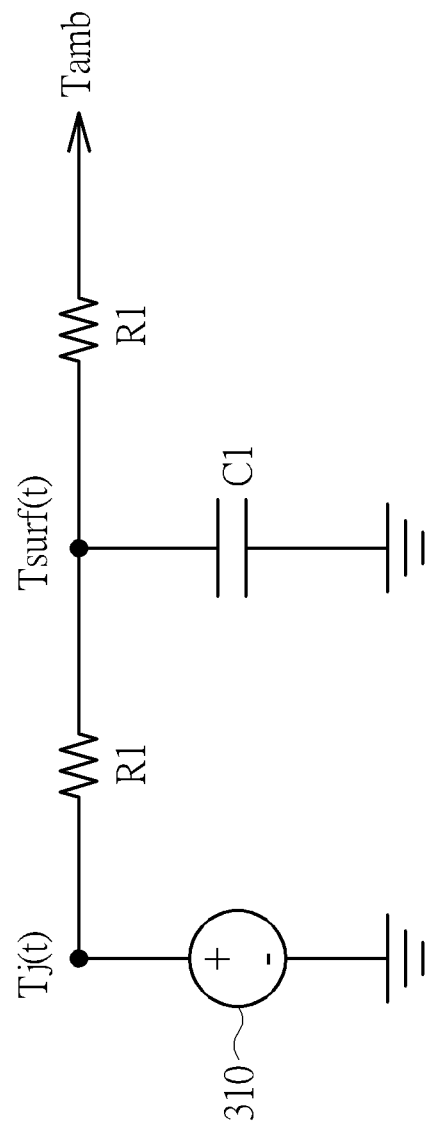
FIG. 3 shows the circuit model for describing the thermal behaviors according to one embodiment of the present invention.

In this embodiment, the parameter θ is used to model the relationship between the junction temperature Tj and the surface temperature Tsurf, and the calculating circuit 216 calculates the new upper limit of the junction temperature Tj_limit_new according to the upper limit of the surface temperature Tsurf_limit, the surface temperature Tsurf (i.e. the current surface temperature) and the parameter θ. In detail, the new upper limit of the junction temperature Tj_limit_new can be calculated as follows:

$$Tj\_limit\_new = Tj\_limit\_old + \Delta Tj(Tsurf\_limit, Tsurf(t), \theta) \quad (1)$$

wherein "Tj_limit_old" is the previous upper limit of the junction temperature. The parameter θ can be represented as a circuit model comprising thermal resistor(s) and capacitor(s). FIG. 3 shows the circuit model for describing the thermal behaviors according to one embodiment of the present invention. As shown in FIG. 3, the circuit model comprises two thermal resistors R1 and R2 and a thermal capacitor C1, the junction temperature Tj(t) can be modeled as a voltage source 310 coupled between the thermal resistor R1 and a ground voltage, an ambient temperature Tamb can be modeled as another voltage source coupled to the thermal resistor R2, and the surface temperature Tsurf can be modeled as an internal node between the thermal resistors R1 and R2. By using the circuit model shown in FIG. 3, the ΔTj in the formula (1) can be expressed as follows:

$$\Delta Tj = c1*(Tsurf\_limit - Tsurf\_n) + c2*(Tsurf(n-1) - Tsurf\_n) \quad (2)$$

where c1 and c2 are functions of the thermal resistors R1 and R2 and the thermal capacitor C1, Tsurf_n is a surface temperature corresponding to the time "n", and Tsurf_(n−1) is a surface temperature corresponding to the time "n−1". In this embodiment, c1 and c2 can be expressed as follows:

$$c1 = c0 + F1\left(\frac{R1}{R2}\right) + F2\left(\frac{R1}{R2}, R1C1\right) \quad (3)$$

$$c = F3\left(\frac{R1}{R2}, R1C1\right) \quad (4)$$

wherein c0 is a constant, and F1, F2 and F3 are functions.

By using the above-mentioned formula (1)-(4), the new upper limit of the junction temperature Tj_limit_new can be calculated for the following dynamic thermal management. In one embodiment, the ΔTj can be calculated as follows:

$$\Delta Tj = (Tsurf\_limit - Tsurf\_n) + \frac{R1}{R2}*(Tsurf\_limit - Tsurf\_n) + R1C1*((Tsurf\_limit - Tsurf\_n) + (Tsurf\_(n-1) - Tsurf\_n)) \quad (5)$$

In the embodiment shown in FIG. 2, the parameter calculator 214 is an on-the-fly parameter calculator, that is the parameter θ can be changed/updated when the portable device 100 is used. In order to obtain the appropriate parameter θ based on the current surface temperature Tsurf and the junction temperature Tj, the thermal resistors R1 and R2 and the thermal capacitor C1 are dynamically adjusted with the current surface temperature Tsurf and the junction temperature Tj. In one embodiment, the parameters (R1/R2) and (R1C1) used in the formula (3)-(5) can be obtained by solving the following equations (6) and (7):

$$(Tsurf\_n + Tamb\_n)*\left(\frac{R1}{R2}\right) + Tsurf\_n * R1C1 - Tj\_n - Tsurf\_n; \quad (6)$$

$$(Tsurf\_(n-1) + Tamb\_(n-1))*\left(\frac{R1}{R2}\right) + \quad (7)$$
$$Tsurf\_(n-1)*R1C1 - Tj\_(n-1) - Tsurf\_(n-1);$$

$$\text{wherein } Tsurf\_n = \int_{t(n-1)}^{tn} Tsuft(t)dt,$$

$$Tamb\_n = \int_{t(n-1)}^{tn} Tamb(t)dt, \text{ and } Tj\_n = \int_{t(n-1)}^{tn} Tj(t)dt.$$

By using the parameter calculator 214 to dynamically adjust the parameter θ, the upper limit of the junction temperature Tj_limit_new can be appropriately determined based on the current junction temperature Tj and the surface temperature Tsurf. Furthermore, because the junction temperature limit calculator 210 provides the appropriate upper limit of the junction temperature Tj_limit_new in the real-time manner, the dynamic thermal management circuit 220 can arrange the suitable power budget for the elements within the portable device 100, and the SoC 112 can start to dump the performance by lowering the clock frequency or voltage or disabling some circuit modules when the surface temperature Tsurf is actually close to the upper limit of the surface temperature.

It is noted that the circuit model shown in FIG. 3 and the formula (3)-(5) and equations (6)-(7) are merely illustrative. In other embodiment of the present invention, the circuit model of the parameter θ may include more than two thermal resistors and more than one thermal capacitor. As long as the new upper limit of the junction temperature Tj_limit_new can be calculated based on the current surface temperature Tsurf, these alternative designs of the circuit models shall fall within the scope of the present invention.

Figure 4:
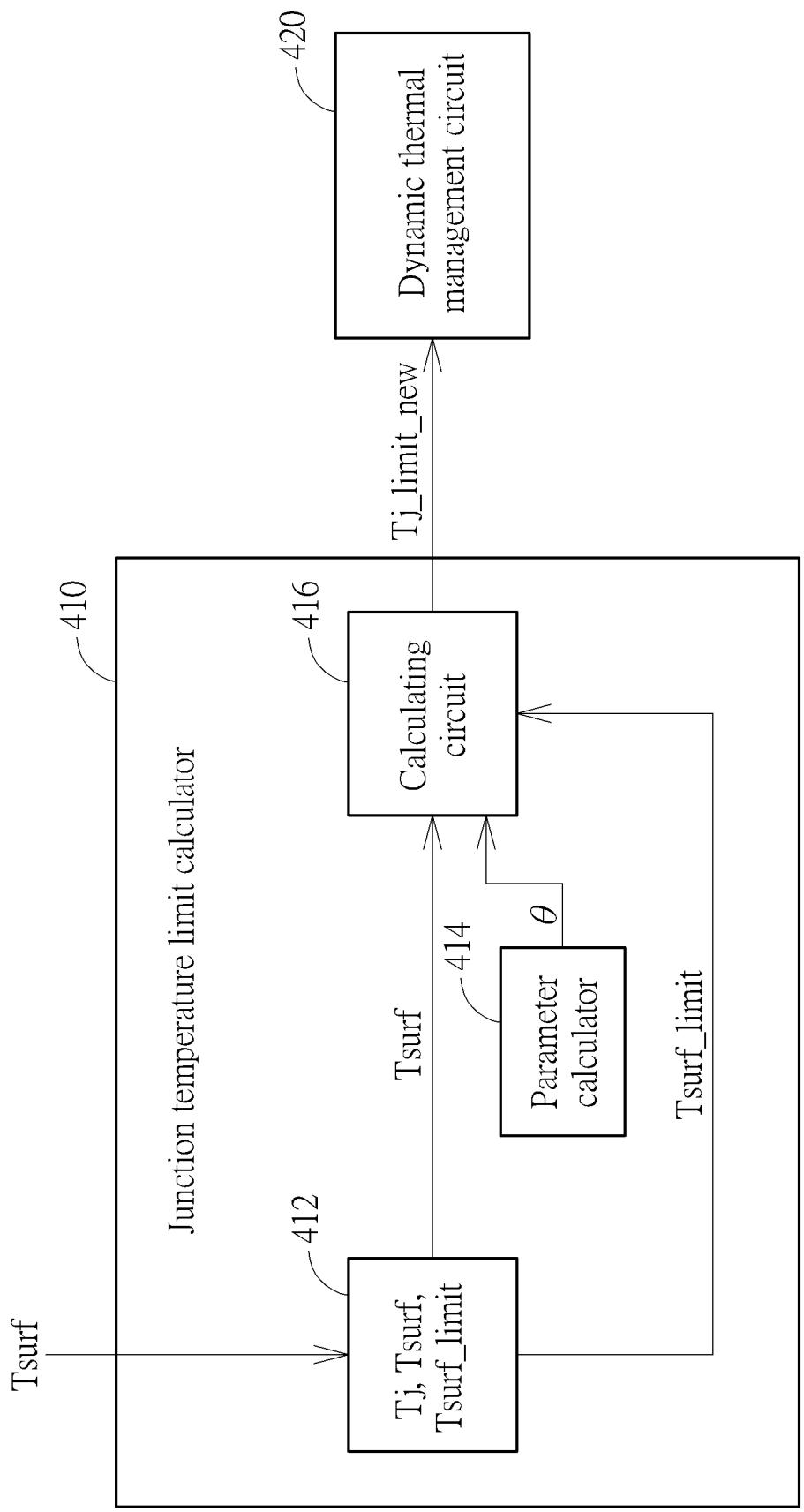
FIG. 4 is a diagram illustrating a junction temperature limit calculator and a dynamic thermal management circuit according to another embodiment of the present invention.

FIG. 4 is a diagram illustrating a junction temperature limit calculator 410 and a dynamic thermal management circuit 420 according to another embodiment of the present invention, wherein the junction temperature limit calculator 410 and the dynamic thermal management circuit 420 can be built in the SoC 112. As shown in FIG. 4, the junction temperature limit calculator 410 comprises a buffer 412, a parameter calculator 414 and a calculating circuit 416. In the operations of the junction temperature limit calculator 410, the buffer 412 is used for storing a junction temperature Tj measured by the thermal sensor 132 in a real-time manner, a surface temperature Tsurf and an upper limit of the surface temperature Tsurf_limit, wherein the surface temperature Tsurf can be estimated by using the PCB temperature measured by the thermal sensor 134 (e.g. using the method described in US publication no. 2018/0245986), and the upper limit of the surface temperature Tsurf_limit is predetermined. The parameter calculator 414 is used to calculate a parameter θ based on the current junction temperature Tj and the current surface temperature Tsurf when the portable device 100 is powered on. The calculating circuit 416 is configured to generate a new upper limit of the junction temperature Tj_limit_new to update the previous upper limit of the junction temperature.

In this embodiment, the parameter θ is used to model the relationship between the junction temperature Tj and the surface temperature Tsurf, and the calculating circuit 416 calculates the new upper limit of the junction temperature Tj_limit_new according to the upper limit of the surface temperature Tsurf_limit, the surface temperature Tsurf (i.e. the current surface temperature) and the parameter θ. In this embodiment, the new upper limit of the junction temperature Tj_limit_new can be obtained by using the above formula (1)-(5).

In the embodiment shown in FIG. 4, the parameter calculator 414 is configured to generate the parameter θ only at one or more specific times; for example, the parameter calculator 414 may generate the parameter θ only when the portable device 100 is powered on. That is, the parameter θ is pre-built, and the parameter θ may not be updated when the portable device 100 is used by the user. In order to pre-build the appropriate parameter θ based on the current surface temperature Tsurf and the junction temperature Tj, the parameters associated with the thermal resistors R1 and R2 and the thermal capacitor C1 shown in FIG. 3 can be determined according to the surface temperature Tsurf and the junction temperature Tj measured at the specific time. In one embodiment, the parameters (R1/R2) and (R1C1) used in the formula (3)-(5) can be obtained by solving the above equations (6) and (7), and the parameters (R1/R2) and (R1C1) (fixed values) are used by the calculating circuit to determine the upper limit of the junction temperature Tj_limit_new.

Figure 5:
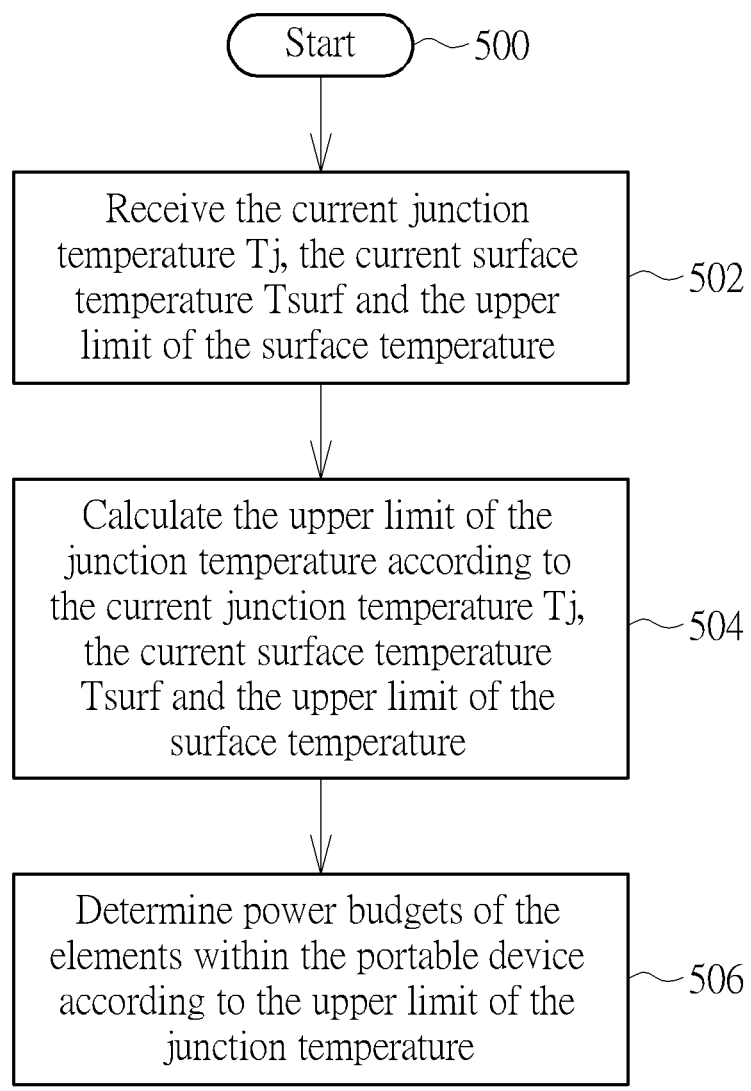
FIG. 5 is a flowchart of a dynamic thermal management method according to one embodiment of the present invention.

FIG. 5 is a flowchart of a dynamic thermal management method according to one embodiment of the present invention. Referring to FIGS. 1-4 and the above disclosure, the flow is described as follows.

Step 500: the flow starts.

Step 502: receive the current junction temperature Tj, the current surface temperature Tsurf and the upper limit of the surface temperature.

Step 504: calculate the upper limit of the junction temperature according to the current junction temperature Tj, the current surface temperature Tsurf and the upper limit of the surface temperature.

Step 506: determine power budgets of the elements within the portable device according to the upper limit of the junction temperature.

Briefly summarized, in the dynamic thermal management method of the present invention, the surface temperature is used to determine the upper limit of the junction temperature of the SoC, and the upper limit of the junction temperature can be used to determine the power budgets of the elements within the portable device. By using the embodiments of the present invention, the power budget for the elements within the portable device can be appropriately arranged, and the SoC can start to dump the performance when the surface temperature of the portable device is actually close the upper limit of the surface temperature, to improve the performance of the SoC.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of dynamic thermal management applied to a portable device, comprising:
   obtaining a surface temperature of the portable device;
   obtaining a junction temperature of a chip of the portable device;
   calculating an upper limit of the junction temperature according to a previous upper limit of the junction temperature and a function of an upper limit of the surface temperature, surface temperatures at different time points, and a parameter varied with the surface temperature and the junction temperature; and
   referring to the upper limit of the junction temperature to control a power budget of the chip or an operating points of other elements within the portable device.

2. The method of claim 1, wherein the step of calculating the upper limit of the junction temperature according to the junction temperature and the surface temperature comprises:
   calculating the upper limit of the junction temperature according to the junction temperature, the surface temperature and an upper limit of the surface temperature.

3. The method of claim 2, wherein the step of calculating the upper limit of the junction temperature according to the junction temperature, the surface temperature and the upper limit of the surface temperature comprises:
   calculating the parameter according to the junction temperature and the surface temperature; and
   calculating the upper limit of the junction temperature according to the parameter, the surface temperature and the upper limit of the surface temperature.

4. The method of claim 3, wherein the parameter is updated in a real-time manner.

5. The method of claim 3, wherein the parameter is built at a specific time, and the parameter is not updated when the portable device is used.

6. The method of claim 2, wherein the step of calculating the upper limit of the junction temperature according to the junction temperature, the current surface temperature and the upper limit of the surface temperature comprises:
   calculating the upper limit of the junction temperature by using a circuit model that describes thermal behaviors of the portable device, wherein the circuit model comprises at least two thermal resistors and at least one thermal capacitor, and the current junction temperature and the current surface temperature are two different nodes of the circuit model.

7. The method of claim 6, wherein the step of calculating the upper limit of the junction temperature by using the circuit model that describes thermal behaviors of the portable device comprises:
   calculating the upper limit of the junction temperature according to values of the at least two thermal resistors and at least one thermal capacitor.

8. The method of claim 6, wherein the step of calculating the upper limit of the junction temperature by using the circuit model that describes thermal behaviors of the portable device comprises:
   updating values of the at least two thermal resistors and at least one thermal capacitor according to the junction temperature and the surface temperature; and
   calculating the upper limit of the junction temperature according to the updated values of the at least two thermal resistors and at least one thermal capacitor.

9. A portable device, comprising:
   a junction temperature limit calculator, comprising:
   a buffer, for storing a surface temperature of the portable device and a junction temperature of a chip of the portable device;
   a calculating circuit, coupled to the buffer, for calculating an upper limit of the junction temperature according to a previous upper limit of the junction temperature and a function of an upper limit of the surface temperature, surface temperatures at different time points, and a parameter varied with the surface temperature and the junction temperature; and
   a dynamic thermal management circuit, coupled to the junction temperature limit calculator, for referring to the upper limit of the junction temperature to control a power budget of the chip or an operating points of other elements within the portable device.

10. The portable device of claim 9, wherein the buffer further stores an upper limit of the surface temperature, and the calculating circuit calculates the upper limit of the junction temperature according to the junction temperature, the surface temperature and the upper limit of the surface temperature.

11. The portable device of claim 10, further comprising: a parameter calculator circuit, for calculating the parameter according to the junction temperature and the surface temperature; wherein the calculating circuit calculates the upper limit of the junction temperature according to the parameter, the surface temperature and the upper limit of the surface temperature.

12. The portable device of claim 11, wherein the parameter calculator circuit updates the parameter in a real-time manner.

13. The portable device of claim 11, wherein the parameter calculator circuit builds the parameter at a specific time, and the parameter is not updated when the portable device is used.

14. The portable device of claim 10, wherein the calculating circuit calculates the upper limit of the junction temperature by using a circuit model that describes thermal behaviors of the portable device, wherein the circuit model comprises at least two thermal resistors and at least one thermal capacitor, and the junction temperature and the surface temperature are two different nodes of the circuit model.

15. The portable device of claim 14, wherein the calculating circuit calculates the upper limit of the junction temperature according to values of the at least two thermal resistors and at least one thermal capacitor.

16. The portable device of claim 14, wherein values of the at least two thermal resistors and at least one thermal capacitor are updated according to the junction temperature and the surface temperature, and the calculating circuit calculates the upper limit of the junction temperature according to the updated values of the at least two thermal resistors and at least one thermal capacitor.

* * * * *